United States Patent
Martin

[15] 3,681,717
[45] Aug. 1, 1972

[54] HF CABLE

[72] Inventor: Helmut Martin, Hannover, Germany

[73] Assignee: Kabel-und Metallwerke Gutehoffnungshutte Aktiengesellschaft, Hannover, Germany

[22] Filed: Feb. 3, 1971

[21] Appl. No.: 112,304

[30] Foreign Application Priority Data

Feb. 24, 1970 Germany............P 20 08 413.3

[52] U.S. Cl..................333/84 R, 333/96, 333/97 R, 343/767, 343/784, 343/872

[51] Int. Cl........H01p 3/02, H01p 3/06, H01q 13/20

[58] Field of Search..................333/84, 84 L, 96, 97; 343/767–771, 784, 872; 340/258 R, 258 A–258 D

[56] References Cited

UNITED STATES PATENTS

2,580,155   12/1951   Brannen..................340/285 C
3,534,303   10/1970   Hafner........................333/95 S

*Primary Examiner*—Herman Karl Saalbach
*Assistant Examiner*—Marvin Nussbaum
*Attorney*—Smyth, Roston & Pavitt

[57] ABSTRACT

A high frequency cable with axial slot in the shield covered by a copper foil of about or thinner than the penetration depth for electromagnetic radiation.

4 Claims, 3 Drawing Figures

INVENTOR
Helmut Martin
Smyth, Roston & Pavitt
Ralf H. Siegemund
ATTORNEYS

HF CABLE

The present invention relates to a high frequency cable wherein an electromagnetic field is developed in a dielectric substance within the cable, the dielectric material being in turn enveloped by a metallic shield having an axial gap or slot, so that a partial outer field develops.

Frequently HF signals are to be transmitted from a stationary transmitter to a movable receiver, or reverse. For example, for the transmission of video signals from a stationary TV camera to receiving equipment on a vehicle, there are used cables which conduct the HF energy, supposedly with little actual loss, but the cable also radiates HF electromagnetic energy towards the vehicle as moving e.g. on rails along the cable. It is already known to utilize symmetric and shielded HF cables, for example, so-called ribbon cables for this purpose. Such cables, however, suffer losses and possess radiation characteristics heavily dependent upon weather and other ambient conditions. This is particularly true when such a cable is laid out flat, on any ground, in the open.

Another type of radiating cable, being approximately of the coaxial variety, has an inner conductor and an outer conductor wherein the outer conductor is provided with a slot exposing insulation on the inner conductor. Electromagnetic radiation is transmitted through the slot in the outer conductor. One drawback of such a device lies in the fact that the intensity of the radiation field decreases rapidly with increasing distance from the cable. In order to attain sufficiently strong input for a receiver, the power input for the cable must be rather high. However, energy transmission through the cable is limited by the dimensions thereof. Therefore, a third possibility for obtaining the necessary signal strength could thus be seen in providing an HF cable of correspondingly larger dimensions. However, not only is such a cable more expensive and, therefore, uneconomical, it is also considerably heavier which poses problems for installation, etc.

Another drawback of the known HF cables lies in the following; the field as inductively or capacitively coupled to the input of a pick device such as a receiver has stray components to a considerable extent and, accordingly, heavy dielectric and eddy current losses are incurred. Thus, there is considerable dissipation and loss of energy as between transmitter and receiver.

The present invention solves the problem of providing a high frequency cable which is capable of radiating at lower losses as compared with cables of known construction. Also, it is an object of the invention to provide a high frequency, radiating cable which operates substantially independent from weather and climate. The particular problem is solved in accordance with the invention in that the axial gap or slot of the shield is covered with a metallic foil dimensioned so that the electrical component of the field cannot propagate through, while the magnetic component passes through without being significantly weakened due to eddy current losses. The foil has preferably very low magnetic permeability. As dielectric losses are no longer incurred in the immediate vicinity of the conductor, the total losses in an HF radiating conductor according to the invention, are reduced, and there is significantly less attenuation of HF energy. Another advantage of the invention is to be seen in that the radiation transmission characteristics of such a cable no longer varies with changes in climate and weather. This is particularly so, as the dielectric material in the cable was predominently responsible for dependency on the performance of the cable upon changes in weather; as there is no longer any dielectric material that is exposed, the performance of the cable will no longer deteriorate.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
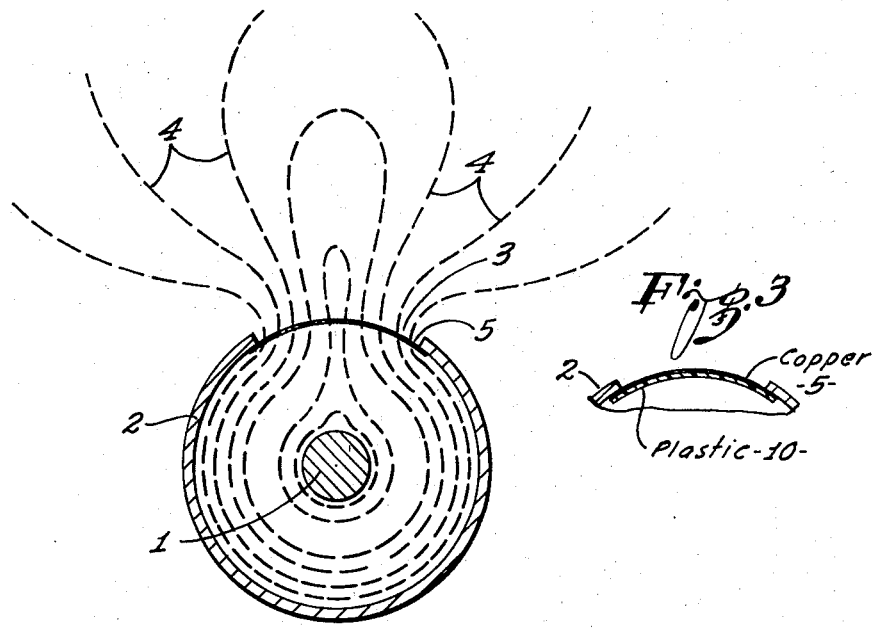
FIG. 1 is a cross-section through a radiating conductor constructed in accordance with a first embodiment of the invention.
Figure 3:
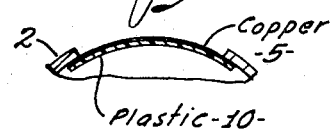
FIG. 3 illustrates a grossly enlarged view through a foil for the conductor.

Proceeding to the description of the drawings, in FIG. 1 there is illustrated an HF conductor of the coaxial variety with a first, centrally disposed conductor 1 and a return conductor 2 enveloping conductor 1 concentrically but not completely. The return conductor 2 is provided here to serve also as a shield for conductor 1. Conductor 2 is provided with an axial gap or slot 3. As a consequence, a partial, outer field is developed, the field lines thereof having configuration as shown by reference numeral 4 and penetrating that slot for deployment outside of the cable.

In accordance with the invention, it is particularly suggested to cover the gap with a metallic sheathing or foil 5. The foil is preferably made of copper, as copper has only insignificant magnetic permeability. Copper is a very good electric conductor, and therefore, the electrical component of the field developed between conductor 1 and shield 2 is not permitted to pass through the slot. On the other hand, due to the low permeability and magnetic susceptibility of copper, the magnetic component does, in fact, penetrate the gap.

Of course, foil 5 has to be very thin. The foil may be self supporting, but it is of advantage to use a plastic carrier sheet 10 and to provide the foil as a very thin layer of copper on carrier 10 by, for example, vapor depositing copper in vacuum onto the plastic sheet 10. This sheet with copper layer is then provided in and across the gap 3.

As stated above, metallic foil or layer 5 should be very thin but a more accurate determination of that thickness is required. It was found that the metallic foil or layer 5 should be thinner than the so-called penetration depth δ for electromagnetic radiation which is determined in accordance with the following equation $$\delta = K \frac{10}{2\pi} \cdot \sqrt{\frac{s}{f \cdot \mu}} \quad \text{(in millimeters)}.$$

Herein $\rho$ is the electric conductivity, and $\mu$ is the relative permeability of the foil material; $K$ is a factor which has value between 0.3 and 3.0, and finally, $f$ is the frequency of the HF energy propagating through the cable and to be transmitted through the gap in the shield.

The ring space between conductors 1 and 2 is occupied by dielectric material. Foil 5 prevents exposure of that dielectric material through the gap or slot. Air is sufficient as dielectric substance. On the other hand, it is necessary to support the outer conductor 2 on the inner conductor 2 by means of spacers. For manufacturing it was found to be best if the dielectric is a solid material, and the metallic foil or the plastic foil with layer 5 can very easily be placed onto that solid dielectric material occupying the space between conductors 1 and 2.

Figure 2:
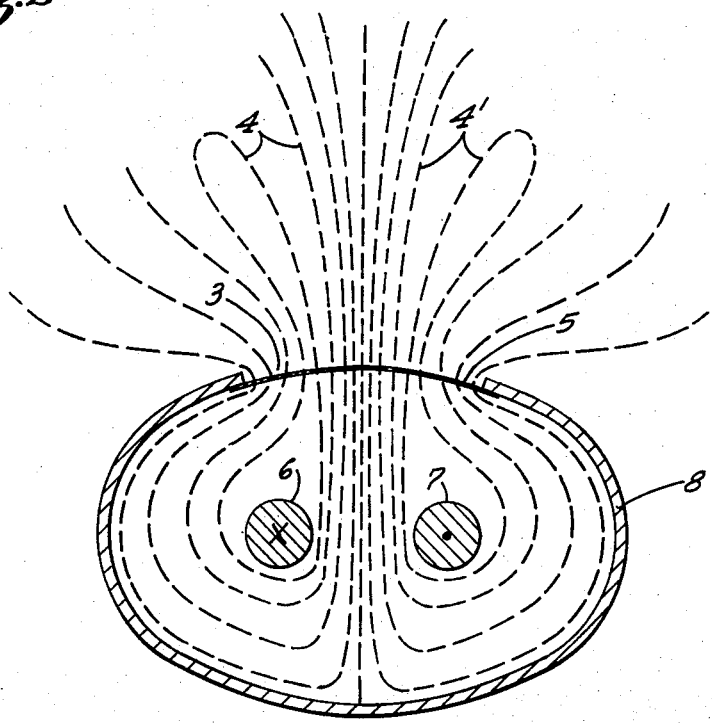
FIG. 2 illustrates a cross-section through a differently constructed HF conductor, both Figures however constituting examples for the preferred embodiment of the present invention.

The embodiment shown in FIG. 2 is constructed in accordance with the same rules expounded above. The basic difference is that there are two conductor cores inside of the shield. Reference numeral 6 denotes the conductor core as the principal signal conductor while core 7, laterally displaced from core 6, provides the return path. The two conductors 6 and 7 are enveloped in part by a shield, which serves only as shield and is not used as return conductor. Of course, the configuration of this shield is not concentrical as to either of the two conductors 6 and 7 but symmetrical to the center line between the shield. Shield 6 has a slot or gap which is aligned with the center line between the two conductors 6 and 7. The field lines 4 as illustrated exhibit significant concentration along a plane or symmetry through the center line between the conductors and the center of the gap so that the resulting stray field is accordingly relatively low. This particular configuration of FIG. 2 is preferred though more expensive. The gap is covered by a foil or layer 5 as designated.

The invention is not limited to the embodiments described above but all changes and modifications thereof not constituting departures from the spirit and scope of the invention are intended to be included.

I claim:

1. High frequency cable having at least one conductor, dielectric material around the conductor and a metallic shield around the dielectric material, the shield provided with an axial slot for permitting development of a field outside of the shield as an electromagnetic field is developed in the cable, the field when developed in the cable having an electric and a magnetic component as propagating through the cable, the improvement comprising a metallic foil disposed across the slot for preventing exposure of the dielectric material to the exterior, the foil having thickness about equal to or smaller than the penetration depth so as to inhibit propagation of the electric component through the foil, while attenuating only insignificantly the magnetic component as penetrating the foil.

2. Cable as in claim 1, the foil comprised of a vacuum deposited layer on a plastic carrier.

3. Cable as in claim 1, the foil made of metal of high electric conductivity and low magnetic permeability.

4. Cable as in claim 3, the foil made of copper.

* * * * *